US008707373B2

(12) United States Patent
Lee et al.

(10) Patent No.: US 8,707,373 B2
(45) Date of Patent: Apr. 22, 2014

(54) METHOD AND SYSTEM FOR PROVIDING DIGITAL VIDEO DISTRIBUTION

(75) Inventors: Lin-Nan Lee, Potomac, MD (US);
Mustafa Eroz, Germantown, MD (US);
Feng-Wen Sun, Germantown, MD (US);
John Corrigan, Chevy Chase, MD (US);
Walter Kepley, Gaithersburg, MD (US);
Kuriacose Joseph, Gaithersburg, MD (US); Scott Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 2364 days.

(21) Appl. No.: 10/843,766

(22) Filed: May 12, 2004

(65) Prior Publication Data

US 2004/0268408 A1    Dec. 30, 2004

Related U.S. Application Data

(60) Provisional application No. 60/470,577, filed on May 14, 2003.

(51) Int. Cl.
*H04N 7/18* (2006.01)
*H04N 7/173* (2011.01)
*H04N 7/16* (2011.01)

(52) U.S. Cl.
USPC .............. 725/82; 725/114; 725/138; 725/144

(58) Field of Classification Search
USPC ................................. 725/82, 78, 74
See application file for complete search history.

(56) References Cited

U.S. PATENT DOCUMENTS

| 5,936,660 | A | 8/1999 | Gurantz ........................ 348/10 |
|---|---|---|---|
| 6,678,740 | B1 * | 1/2004 | Rakib et al. ................... 709/247 |
| 7,200,855 | B2 * | 4/2007 | Laksono ......................... 725/82 |
| 7,242,766 | B1 * | 7/2007 | Lyle ................................. 380/2 |
| 7,549,056 | B2 * | 6/2009 | Carr .............................. 713/189 |
| 2002/0007490 | A1 * | 1/2002 | Jeffery ............................ 725/78 |
| 2002/0049879 | A1 * | 4/2002 | Eyer ............................. 710/305 |
| 2004/0086000 | A1 * | 5/2004 | Wallace et al. ............... 370/503 |

* cited by examiner

*Primary Examiner* — Hai V Tran

(57) ABSTRACT

An approach is provided for distributing multi-media information from a satellite broadcast system. A hub receives a signal from the satellite broadcast system, wherein the signal represents video information and audio information associated with multiple broadcast channels. The hub centrally demodulates and decodes the received signal for distribution to one of a number of access point devices. According to one embodiment of the present invention, the decoded signal represents uncompressed video and audio information corresponding to one of the broadcast channels. The access point devices convert the received decoded signal for output respective displays (e.g., television sets). The hub can also be equipped with an interface to provide access to a public data network, such as the global Internet. Further, the hub can be supplied with a digital video recording capability.

10 Claims, 8 Drawing Sheets

METHOD AND SYSTEM FOR PROVIDING DIGITAL VIDEO DISTRIBUTION

RELATED APPLICATIONS

This application is related to, and claims the benefit of the earlier filing date under 35 U.S.C. §119(e) of U.S. Provisional Patent Application Ser. No. 60/470,577, filed May 14, 2003, titled "Digital Television Set-Top Box"; the entirety of which is incorporated herein by reference.

FIELD OF THE INVENTION

The present invention relates to a broadcast communication system, and more particularly to distribution of digital video signals.

BACKGROUND OF THE INVENTION

Households have embraced subscription-based television programming services, in large part, because they find over-the-air analog broadcasts of television programming to be unacceptable in terms of the limited number of programming channels and generally poor signal quality. Unless a household is located near a broadcast tower for a particular channel, poor reception has spurred consumers to pay for television programming. Direct Broadcast Satellite (DBS) systems have gained significant commercial success because of the variety of programming as well as the high quality of the digital transmission. In addition to television programming, DBS systems can provide households with other services, such as audio streaming, and data transmission. Another trend is that it is increasingly common to find households with multiple television sets. Conventionally, both satellite-based and terrestrial approaches (e.g., cable television) require the use of multiple set-top boxes to receive the television programming. Another trend is the rapidly increasing density of integrated circuit technology and corresponding decline in prices for consumer electronic products.

FIG. 9 shows a conventional system for distributing satellite broadcast signals in the home using multiple set-top boxes. A direct broadcast system utilizes a satellite (not shown) to broadcast programming that originates from a head-end (not shown) and received by a Receive-only satellite antenna 901. The receiving antenna 901 is typically a parabolic dish antenna with a low noise block converter (LNB), which amplifies, filters and shifts the incoming broadcast signal to an intermediate frequency (IF) band. The IF signal is then distributed via an IF multi-switch 903 to set-top boxes 905, which provide programming to television sets 907. Each of the set-top boxes 905 includes a conditional access card 909 to specify that the particular set-top box 905 is authorized to receive the programming. Typically, a remote control device 911 is also supplied to the user to conveniently select programming. The set-top box 905 couples to a telephone jack to communicate billing and control information to the satellite broadcast service provider.

It is noted that the cost of manufacturing a set-top box 905 is dominated by the cost of the large number of interfaces. These interfaces are difficult to integrate into the system chip because of the high voltages and/or frequencies at which they must operate. Such interfaces include the telephone, a smart card, LNB control, and channel 3/4 video interfaces. Each of these interfaces requires specially designed components, which significantly add the to the cost. In homes with multiple set-top boxes, these expensive interfaces are replicated needlessly.

As evident from FIG. 9, the addition of a television set requires purchasing another set-top box 905. This approach has a number of drawbacks. A major disadvantage is the duplication of hardware, resulting in high cost. Also, upgrading of the set-top boxes requires the installer/user to implement the modifications multiple times. Furthermore, traditional set-top boxes are not easily upgradable because of their inflexible architecture. Also, with the conventional set-top boxes, the addition of more boxes may entail installing more corresponding phone jacks. Because the cost of "scaling" is high, the user is reluctant to purchase additional set-top boxes, thereby reducing revenue for the satellite broadcast service provider. Additionally, because of the size of the set-top boxes, space limitations may become a concern as more boxes are acquired.

Also, traditionally, home "networking" systems have been geared towards computer networks. As such, numerous engineering challenges make distribution of television programming over home computer networks infeasible, inconvenient or costly. These challenges include, for example, cabling and hardware and software incompatibility between the computer and the television set.

Therefore, there is a need for an approach that distributes DBS programming by maximizing shared hardware components. There is also a need for cost-effectively scaling to accommodate multiple television sets, while maintaining high signal quality. There is also a need to conserve physical space in the distribution of DBS programming. There is a further need to easily implement hardware upgrades.

SUMMARY OF THE INVENTION

These and other needs are addressed by the present invention, wherein a hub distributes multi-media information from a satellite broadcast system to multiple access point devices, which display the information on a television set or monitor. The hub can send uncompressed (or compressed) digital video and digital audio to the access point devices, and receive remote control commands back over standard cabling. The hub supports simultaneous reception of multiple receive signals, which can be readily accommodated, in an exemplary embodiment, in a system chip, thereby taking advantage of the large increase in density of modern digital integrated circuits. The hub can also be equipped with a hard disk drive to provide digital video recording (DVR) capabilities, and can include a local area network (LAN) interface for support of various communication services (e.g., Web browsing). The above arrangement advantageously provides sharing of expensive hardware, thereby reducing overall cost of the system.

According to one aspect of an embodiment of the present invention, a method for distributing multi-media information to a plurality of access point devices is disclosed. The method includes receiving a signal containing digital video information. The method also includes centrally demodulating and decoding the signal. The method further includes forwarding the demodulated signal in uncompressed digital form to one of the access point devices.

According to another aspect of an embodiment of the present invention, a method for supporting distribution of multi-media information is disclosed. The method includes receiving a signal containing uncompressed digital video information distributed from a central hub. The method also includes converting the video signal to a format compatible to a display. Further, the method includes outputting the converted video signal to the display.

According to another aspect of an embodiment of the present invention, a hub for distributing multi-media information from a satellite broadcast system is disclosed. The hub includes a satellite tuner configured to receive a signal containing digital video information; and a demodulator configured to demodulate the received signal for distribution to a plurality of access point devices, wherein the demodulated signal represents uncompressed digital video information.

According to another aspect of an embodiment of the present invention, an access point device for supporting distribution of multi-media information from a satellite broadcast system is disclosed. The device includes a decoder configured to convert a signal containing uncompressed digital video information distributed from a central hub for display. The device also includes a radio frequency modulator configured to output the converted video signal.

According to another aspect of an embodiment of the present invention, a hub for providing home distribution of multi-media information from a satellite broadcast system is disclosed. The hub includes a satellite tuner configured to receive a signal from the satellite broadcast system, wherein the signal represents video information and audio information associated with a plurality of broadcast channels. The hub also includes a demodulator configured to demodulate the received signal. The hub further includes a decoder configured to decode the demodulated signal, wherein the decoded signal represents uncompressed video and audio information corresponding to one of the broadcast channels and is transmitted to an access point device among a plurality of access point devices.

According to yet another aspect of an embodiment of the present invention, a hub for providing home distribution of multi-media information from a satellite broadcast system is disclosed. The hub includes means for receiving a signal from the satellite broadcast system, wherein the signal represents video information and audio information associated with a plurality of broadcast channels. Also, the hub includes means for demodulating the received signal. The hub further includes means for decoding the demodulated signal, wherein the decoded signal represents uncompressed video and audio information corresponding to one of the broadcast channels and is transmitted to an access point device among a plurality of access point devices.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for distributing multi-media information from a central hub to a multiple access point devices are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to home distribution of video signals, it is recognized that the approach can be utilized in a variety of facility and premises, and the many other types of signals (e.g., audio, data, images, etc.).

Figure 1:
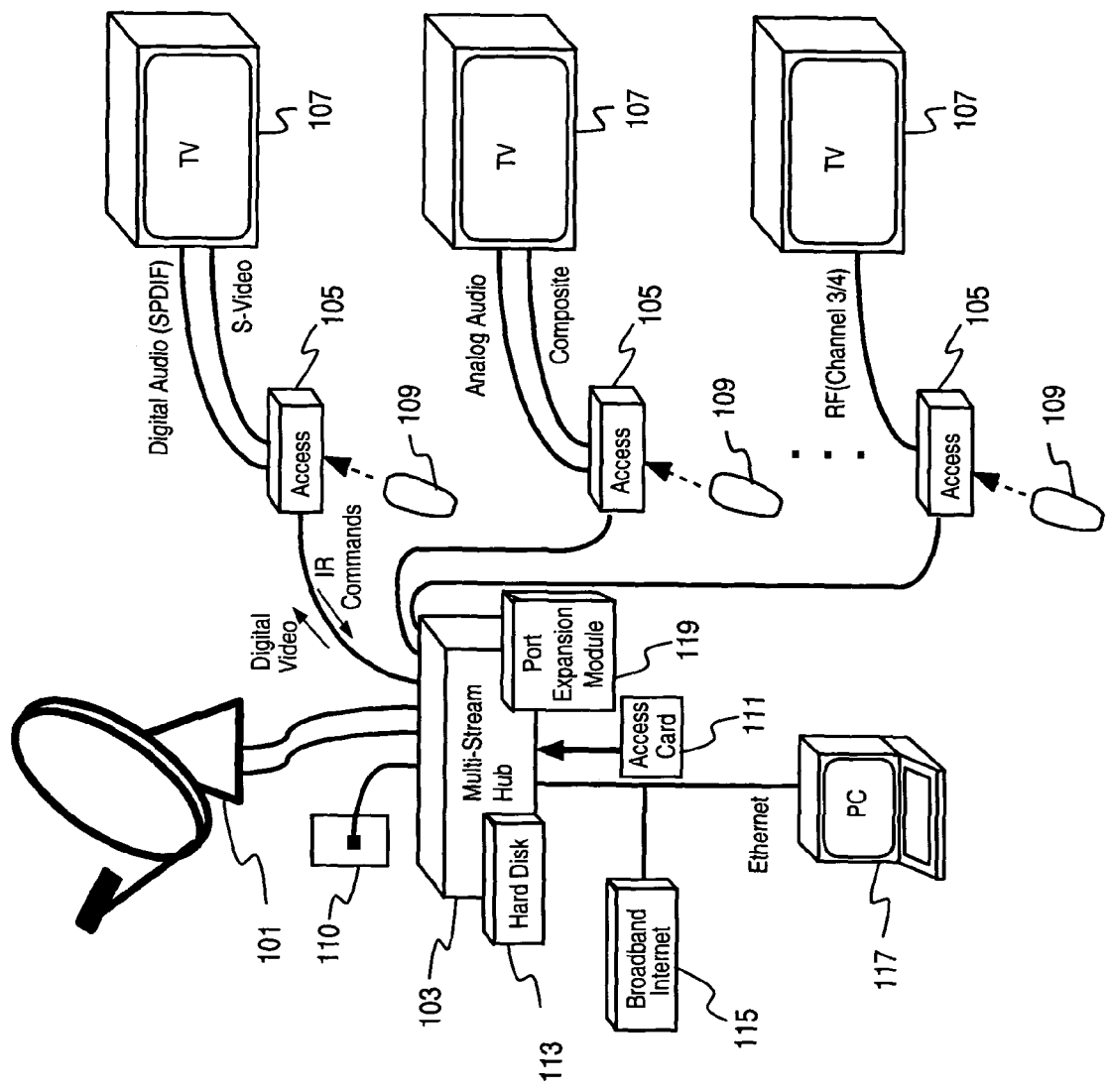
FIG. 1 is a diagram of a multi-stream distribution system, according to an embodiment of the present invention.

FIG. 1 is a diagram of a multi-stream distribution system, according to an embodiment of the present invention. Direct broadcast satellite (DBS) systems afford household subscribers with many services, ranging from vast television programming to streaming of audio, as well as data services. Each household subscribing to the system receives the broadcast signals through a satellite dish receiver antenna. Content providers supply the DBS systems with programming; given the numerous programming offerings, the DBS provider employ compression, such as Motion Pictures Expert Group (MPEG)-2 or MPEG-4 video compression, prior to transmitting the information for relaying by the satellite. The information for broadcast is ultimately directed to the satellite's coverage area utilizing, for example, the Ku-band, wherein each subscriber within the coverage area can receive the broadcast programming.

In this exemplary configuration, a satellite signal is received by an antenna 101, and forwarded to a multi-stream hub (or gateway) 103, which in turn distributes the received signal to one or more access point devices 105. One implementation equips the hub 103 to support four access point devices 105. The hub 103 supplies all of the traditional set-top box functions for four independent viewing locations. The four video outputs (for four locations) are conveyed via full bandwidth digital distribution equivalent to SMPTE-292 so as to prevent any loss of quality.

The satellite antenna 101 typically includes a parabolic dish and a low noise block (LNB) (not shown), and is mounted outside the house. The LNB amplifies, filters and shifts the incoming signal to an intermediate frequency band, such as L-band (between about 1.0 GHz and 2.0 GHz). The antenna, in an exemplary embodiment, is linked to the multi-stream hub 103 via coaxial cables. According to one embodiment of the present invention, the LNB Inter-facility link (IFL) coaxial cables are routed to the hub 103 without the use of an external multiswitch, thus offering better radio frequency (RF) performance.

Figure 9:
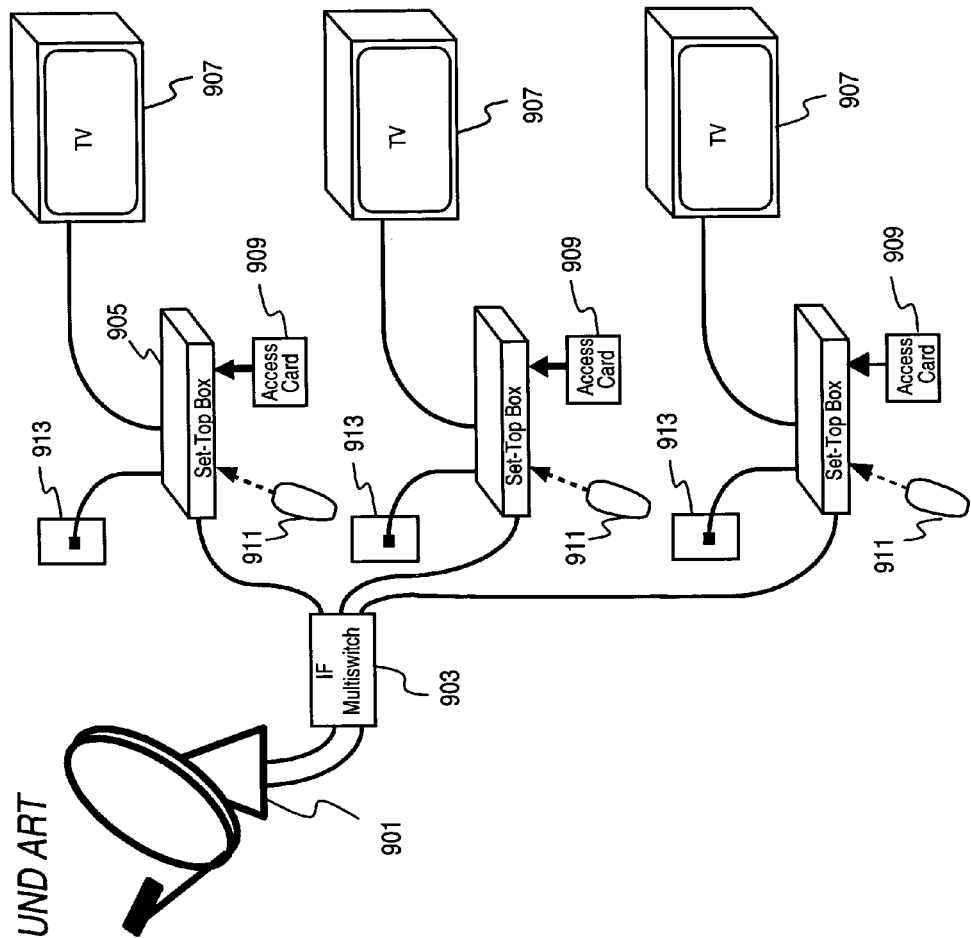
FIG. 9 is a diagram of a conventional system for distributing satellite broadcast signals in the home using multiple set-top boxes.

The access point device 105 is a small connector interface block housing an Infrared Receiver (IR) port on it, and can be powered via the coaxial cable (as shown below in FIG. 3B). The hub 103 has a clear cost advantage over the conventional set-top box system (FIG. 9) in homes with multiple television sets because less hardware is replicated for each access point device 105. The access point devices 105 can be configured to support a variety of audio/video connections, such as digital audio (e.g., digital stereo audio, and DOLBY® Digital) with an S-video output, and an analog audio with composite video outputs, as well as radio frequency (RF) channels 3/4 (NTSC (National Television System Committee)/PAL (Phase Alternation Line). As will be more fully described, the access point devices 105, unlike conventional set-top boxes, possess minimal components for displaying the satellite signals to a number of displays 107 (e.g., television set). The hub 103 makes available to each of the access point devices 105 all available content received from the satellite. Central storage of locks and limits, favorites lists, language preferences, etc. are supported by the hub 103, thereby eliminating the need for the user to set up each set-top box separately (as in the conventional system). In addition, the hub 103 provides local overrides for the access point devices 105.

The multi-stream hub 103 advantageously avoids duplication of many receiver components. For example, only a single phone jack 110 is needed to support multiple television sets 107. A single access card 111 can be utilized to determine whether the multi-stream hub 103 has access to the broadcast satellite programming. The hub 103 can support an interactive A/V connection to any room in the house beyond viewing of broadcast video.

In particular, the hub 103 can optionally be equipped with a hard drive 113 to provide digital video recording (DVR) capabilities. By adding a hard disk and a local area network (LAN) interface (e.g., Ethernet) to the hub 103, a number of additional entertainment services can be delivered. The interface can be used to communicate with other multi-stream hubs 103, media servers, personal computers supporting multimedia or Web content, or the Internet. If an Internet connection is available at the hub 103, the connection could be used to access the population of customer devices in lieu of a telephone connection. This additional functionality is useful in customer service situations for diagnostics, download and other purposes.

The DVR option can be offered by the service provider as an upgrade. Undoubtedly, a hub with a single hard disk has a significant cost advantage over a system utilizing a hard disk in each set-top box. By supporting DVR functionality in the multi-stream hub 103, all access point devices 105 throughout the home can access recorded programming. The hub 103 can support simultaneous record and playback of program material.

Based on the software and hardware interfaces provided, the multi-stream hub 103 can interface with a computer, such as a personal computer 117, using a broadband connection 115 for supporting access to a public data network (e.g., the global Internet).

The above arrangement provides a cost-effective home networking approach to addressing the need for accommodating multiple television sets within a household. The access point devices 105 are "Plug and Play," permitting the user to conveniently add television sets after initial installation of the hub 103. Existing home wiring can be exploited with this approach. Further, the approach of the present invention also advantageously simplifies setup and maintenance of the hub system by centralizing infrastructure requirements (e.g., access cards, and phone line connections) from the set-top box and into a single unit that can be installed as a wall mount in an inconspicuous area, such as a closet, garage or basement.

The architecture of the hub 103 effectively addresses the high costs of needless replication of hardware by sharing most of the expensive interfaces in the hub 103. The hub 103 sends uncompressed digital video and digital audio from the hub to the access point device 105, and remote control commands back to the hub 103 over a shared coaxial cable (or alternatively, Category 5 twisted pair). According to an exemplary embodiment, the interface to provide this functionality can be based on the Society of Motion Picture and Television Engineers (SMPTE) standard 292M, which defines a mechanism to transport HD 4:2:2 video (10 bit samples) over several hundred feet of coaxial cable. For example, SMPTE-259M can deliver component-quality standard definition video over a 75 Ω coaxial cable via a 270 Mb/s serial digital interface. The standard also provides for delivery of digital audio as ancillary data during video blanking times.

The hub 103, according to one embodiment of the present invention, uses a Time Division Multiple Access (TDMA) scheme to send remote control commands back up the cable to the hub 103 during a small portion of the vertical-blanking region.

The architecture of the above hub-to-access point devices is both scalable as well as modular. The multi-stream hub 103 can include a port expansion module 119 to serve more access point devices 105; by way of example, the port expansion module 119 can support groups of four ports to allow for growth in increments of four television sets (or displays). For example, the system can be scaled from a low cost basic 4-TV system with SD signal outputs to a 6-TV, 8-TV, etc. system if required. The architecture scales such that the 4-TV system may be scaled from 4-SD output to a 4-HD output. The architecture can use Universal Serial Bus (USB) interfaces for modularity as well as the use of Serial ATA (SATA) interface for DVR capabilities.

The above system of a central hub 103 serving access point devices 105 can be used to distribute uncompressed audio and video signals as well as compressed signals, according to the various embodiments as described in FIGS. 2-7.

Figure 2:
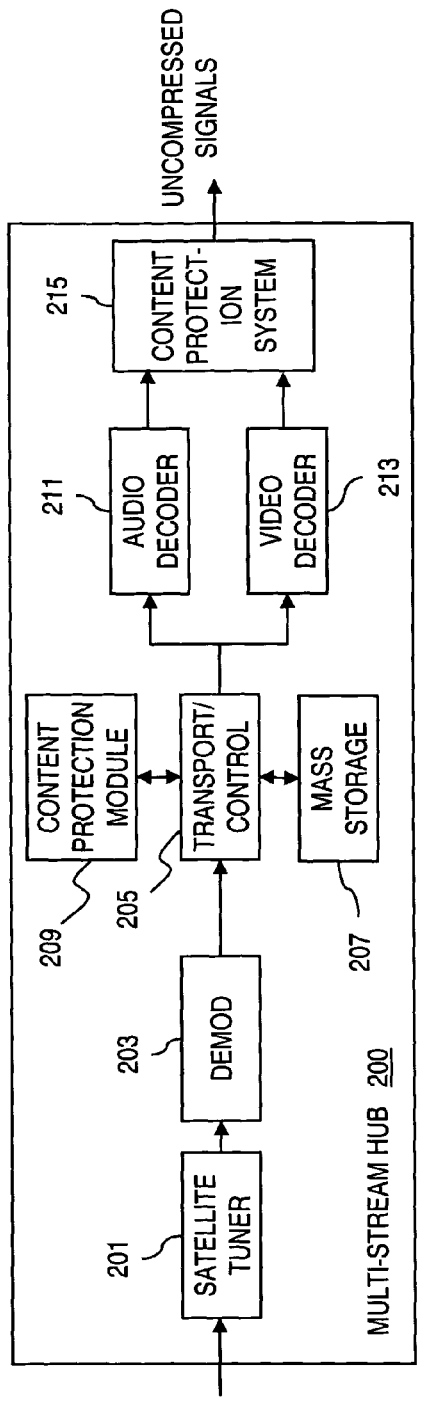
FIG. 2 is a diagram of a multi-stream hub used in the system of FIG. 1 for supporting uncompressed digital video distribution, according to an embodiment of the present invention.

FIG. 2 is a diagram of a multi-stream hub used in the system of FIG. 1 for supporting uncompressed digital video distribution, according to an embodiment of the present invention. For the purposes of explanation the process of distributing the uncompressed digital video is described along with the components of the hub 200 and the components of the access device of FIG. 3. The architecture for the hub 200 and the associated access point device 300 (FIG. 3) provides modularity, while maximizing the reuse of components across the modules, with emphasis on security of the system and content protection. The operation of the hub 200 is explained with respect to FIG. 4.

A multi-stream hub (or gateway) 200 includes a satellite tuner 201 for receiving the broadcast satellite signal from the Outdoor Unit (ODU) (which includes the antenna), per step 401. The hub 200 also provides demodulation of the broadcast satellite signal, as in step 403, via a demodulator 203. A transport and control module 205 performs programming channel selection. Because the broadcast satellite signal is typically encrypted to prevent unauthorized access, a content protection module 209 executes the decryption and works, in an exemplary embodiment, in conjunction with a conditional access card (not shown) to allow the particular hub 200 access to the programming information. By way of example, content protection is provided according to the High-bandwidth Digital Content Protection (HDCP) method (developed by INTEL® Corporation).

According to one embodiment of the present invention, the hub 200 is also equipped with a mass storage device 209 as an option. This device 209 can be a hard disk for recording and playing back the video and audio information. Central storage of this information by the hub 200 reduces the cost and enhances the utility of mass storage by making programming available to all viewing locations (and without constraint in programming schedule).

The decrypted signal is forwarded to an audio decoder 211 and a video decoder 213; these decoders 211, 213 decode the decrypted signals (step 405), outputting uncompressed digital audio and video signals for transmission to one or more access point devices (shown in FIG. 3) over, for example, coaxial cables (e.g., RG-6U), per step 407. Alternatively, the wiring can be twisted-pair (Category 5). In an exemplary embodiment, the uncompressed digital audio and video signals conform to SMTE 292M format. In one embodiment of the present invention, the hub 200 employs content protection to the local transmission of the signals to the access point via a content protection system 215.

Figure 3A:
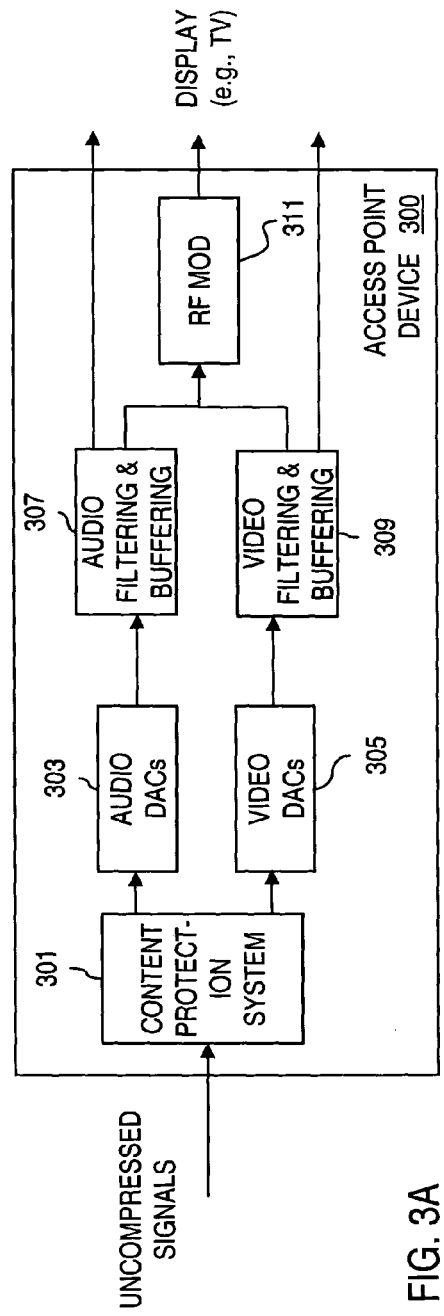
FIGS. 3A and 3B are diagrams of an access point device used in the system of FIG. 1 for supporting uncompressed digital video distribution, according to an embodiment of the present invention.

FIG. 3A is a diagram showing the components of the access point device used in the system of FIG. 1 for supporting uncompressed digital video distribution, according to an embodiment of the present invention. An access point device 300 interfaces a coaxial cable to receive signals from the hub 103, and to output signals to a monitor or TV. In an exemplary embodiment, the device 300 supports Standard definition-analog and High Definition (HDMI-digital) receivers.

The access point device 300 also functions as an infrared receiver to accept IR commands from the user and convey them to the hub 200 for processing. The access point device 300 can be powered by DC (direct current) imposed the coaxial cable. Alternatively, the video signal outputs at the hub 200 can be switched to RF mode using a channel modulator in the hub 200; this permits operation without use of the access point device 300 if some loss of quality is accepted. In this case, an RF remote control is used to convey user commands.

Uncompressed digital signals from the multi-stream hub 200 is received via a high speed serial data interface by an access point device 300, which can be situated remotely from the multi-stream hub 200 within the residence, for example. The access point device 300 deserializes, decrypts, and demultiplexes these bits represented by the signals and then present them to the various output interfaces. The access point device 300 can be configured with different interface options to provide a tiered product line (SD-Basic/SD-Digital Audio/HD). As noted, the access point device 300 also contains an IR detector to receive remote control commands and modu-late them onto cable to the hub 200. HDCP authentication traffic shares the same return link.

The access point device 300 receives uncompressed signals distributed by the multi-stream hub 200 via a contention protection system 301 (which corresponds to that content protection system 215 of the hub 200) and utilizes Digital-to-Analog Converters (DACs) 303, 305 to convert, per step 409, the respective audio and video digital signals into corresponding analog signals. The analog audio signal is transmitted to an audio module 307 for filtering and buffering of the audio signal. Similarly, a video filtering and buffering module 309 is employed for the analog video signal. Depending on the type of audio/video inputs of the display 107 (e.g., television set), the audio filtering and buffering module 307 and the video filtering and buffering module 309 can output signals to a display directly or via a Radio Frequency (RF) modulator 311 in the case of channel 3/4 input, for instance. The interfaces of the access point device is more clearly shown in FIG. 3B.

Figure 3B:
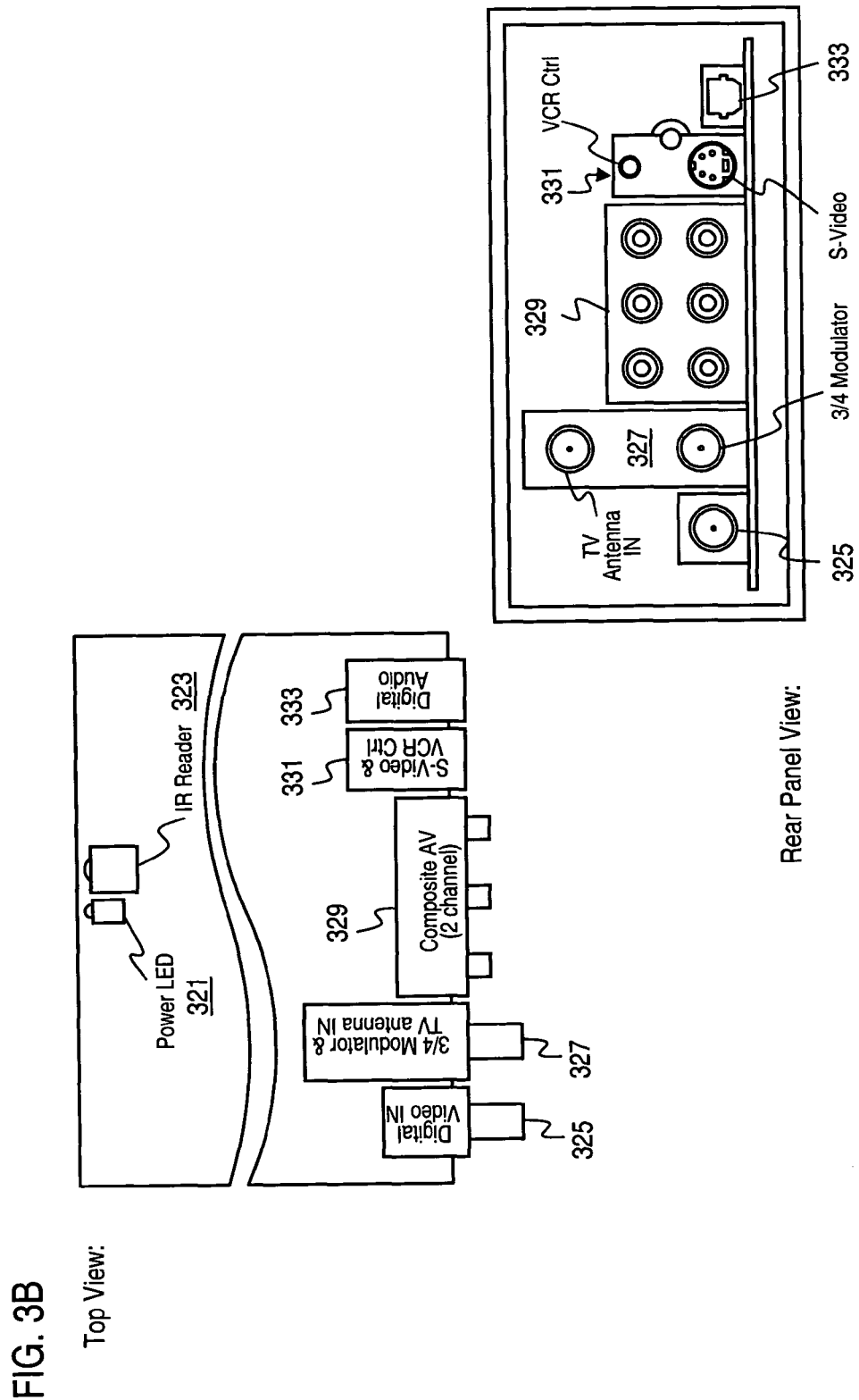
Figure 4:
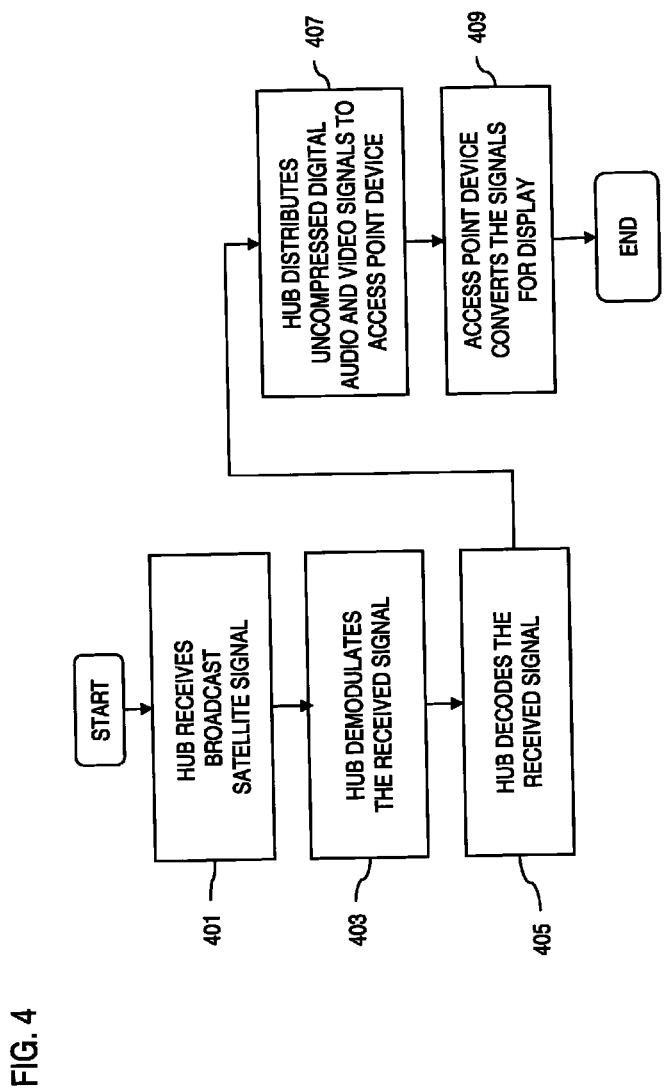
FIG. 4 is a flowchart of a process for distributing uncompressed digital video signals, in accordance with an embodiment of the present invention.

As seen in FIG. 3B, by way of example, the access point device 300 has an LED (Light Emitting Diode) indicator 321 for showing whether power is On or Off, as well as a Infrared reader 323 for accepting commands from a remote control (not shown). In terms of the physical interfaces, the device 300 supplies a Digital Video IN (Input) 325, an RF interface module 327 supporting channel 3/4 input (as mentioned above) and a TV antenna IN. A composite AV module 329 is provided, along with a video module 331 that provides an S-Video and VCR control connections. Further, the access point device 300 has a digital audio interface 333.

Figure 5:
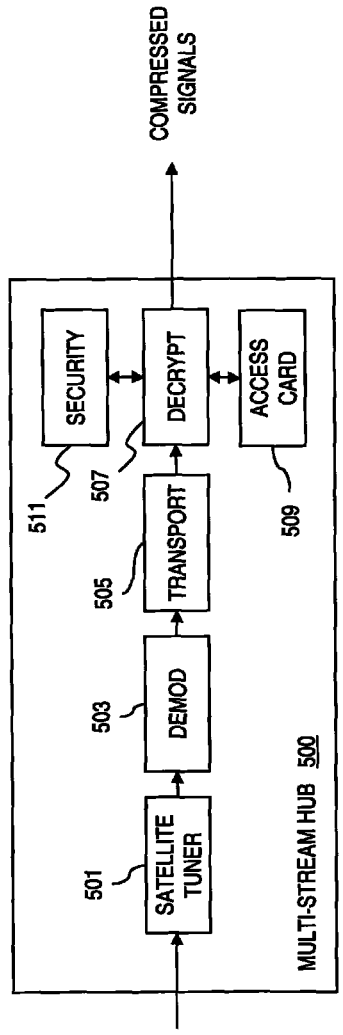
FIG. 5 is a diagram of a multi-stream hub used in the system of FIG. 1 for supporting compressed digital video distribution, according to an embodiment of the present invention.

FIG. 5 is a diagram of a multi-stream hub used in the system of FIG. 1 for supporting compressed digital video distribution, according to an embodiment of the present invention. In the compressed video distribution arrangement, the multi-stream hub 500 essentially relies on the access point device 600 (FIG. 6) for the audio and video decoding. The process of distributing compressed digital video signals is shown in FIG. 7, and is described as follows.

Under this scenario, the multi-stream hub 500 utilizes several of the components found in the multi-stream hub 200 that supports uncompressed video distribution (of FIG. 2). A satellite tuner 501 receives the broadcast satellite signal from an ODU, per step 701. In step 703, the received signal is demodulated by a demodulator 503. A transport module 505 separates out the programming channels. The hub 500 also includes a decryption module 507 as well as a conditional access card 509 and a security module 511. The output from the decryption module 507 is compressed audio and video signals, which are supplied to one or more access point devices, per step 705.

Figure 6:
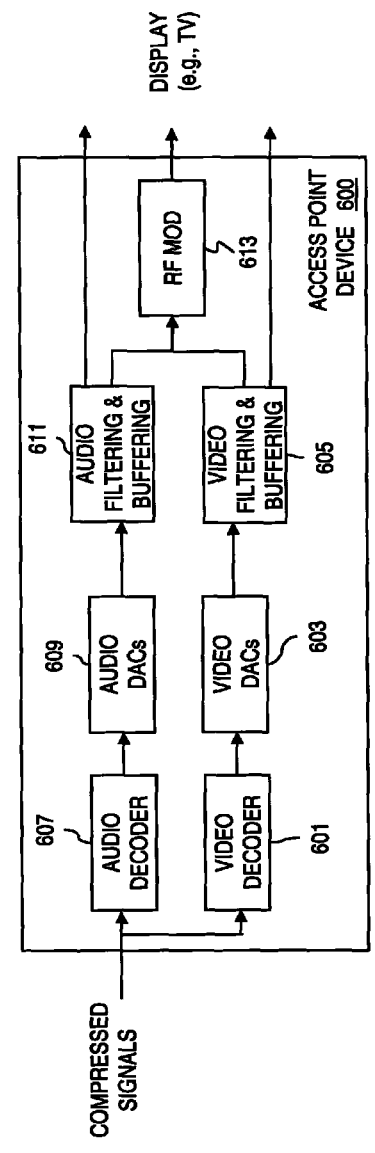
FIG. 6 is a diagram of an access point device used in the system of FIG. 1 for supporting compressed digital video distribution, according to an embodiment of the present invention.
Figure 7:
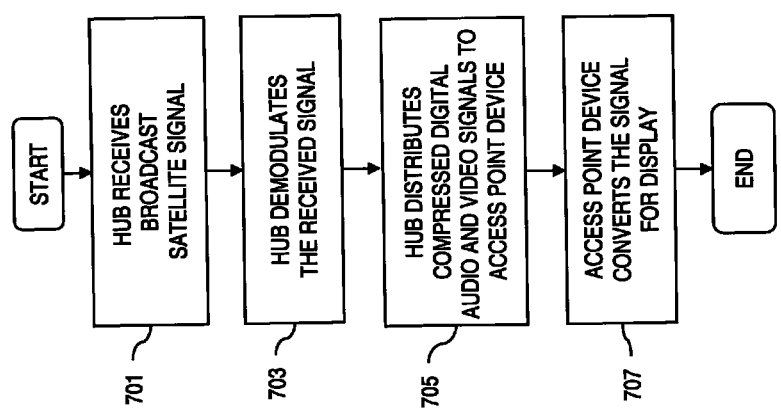
FIG. 7 is a flowchart of a process for distributing compressed digital video signals, in accordance with an embodiment of the present invention.

FIG. 6 is a diagram of an access point device used in the system of FIG. 1 for supporting compressed digital video distribution, according to an embodiment of the present invention. Access point device 600 receives compressed digital signals from the hub 500 and converts these signals for transport to a display, such as a TV set (step 707). Specifically, the access point device 600 possesses a video decoder 601 for decoding the compressed video signal. The output of the video decoder 603 feed to a video DAC 603 to generate an analog video signal that is filtered and buffered by a video filtering and buffering module 605. Similarly, the compressed audio signal received by the access point device 600 is sent through an audio decoder 607, an audio DAC 609, and an audio filtering and buffering module 611. The access point device 600 also includes an RF modulator 613 to support output to channel 3/4 ports.

Figure 8:
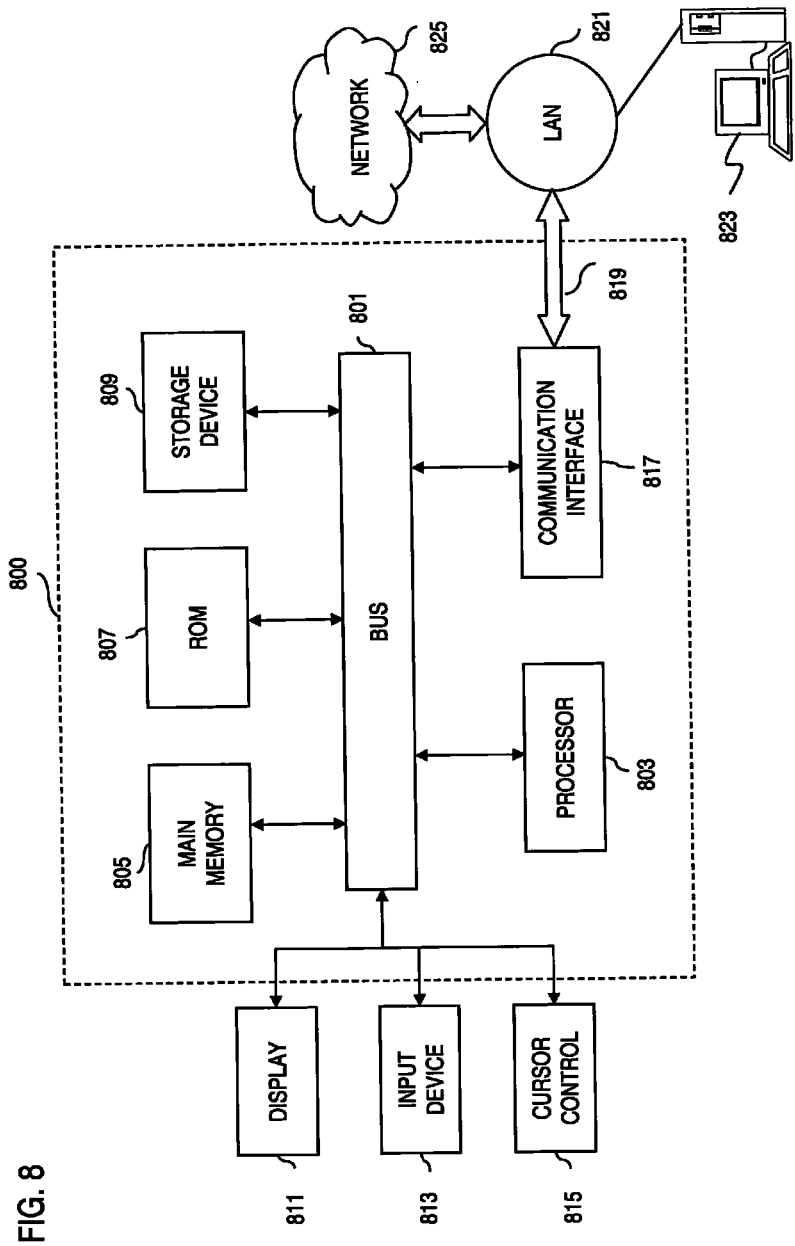
FIG. 8 is a diagram of a computer system that can perform the processes associated with distributing digital video, in accordance with embodiments of the present invention.

FIG. 8 illustrates a computer system upon which an embodiment according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is cursor control 815, such as a mouse, a trackball, or cursor direction keys for communicating direction information and command selections to the processor 803 and for controlling cursor movement on the display 811.

According to one embodiment of the invention, certain functions of the multi-stream hub 103 is provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, or a telephone modem to provide a data communication connection to a corresponding type of telephone line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by service provider. The local network 821 and network 825 both use electrical, electromagnetic, or optical signals to convey information and instructions. The signals through the various networks and the signals on network link 819 and through communication interface 817, which communicate digital data with computer system 800, are exemplary forms of carrier waves bearing the information and instructions.

The computer system 800 can send messages and receive data, including program code, through the network(s), network link 819, and communication interface 817. In the Internet example, a server (not shown) might transmit requested code belonging to an application program for implementing an embodiment of the present invention through the network 825, local network 821 and communication interface 817. The processor 803 may execute the transmitted code while being received and/or store the code in storage device 89, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the various embodiments of the present invention provide an approach for distributing video from a central hub to multiple access point devices. The approach provides for uncompressed distribution of the audio and video signals. The above arrangement advantageously provides a modular, scalable, and cost-effective approach to providing video distribution to multiple television sets.

While the present invention has been described in connection with a number of embodiments and implementations, the present invention is not so limited but covers various obvious modifications and equivalent arrangements, which fall within the purview of the appended claims.

What is claimed is:

1. A method for distributing multi-media information to a plurality of access point devices, the method comprising:
   receiving at a central hub a signal containing digital video information;
   centrally demodulating and decoding the signal at the hub; and
   forwarding the demodulated signal in uncompressed digital form to the plurality of access point devices.

2. A method according to claim 1, further comprising:
   receiving the signal over a satellite communication channel.

3. A method according to claim 1, further comprising:
   encrypting the demodulated signal for transmission to one access point device.

4. A method according to claim 1, further comprising:
   storing the digital video information in a local hard disk for later playback via the one access point device.

5. A method according to claim 1 wherein the plurality of access point devices are a first set, the method further comprising:
   adding a module for interfacing to a second set of access point devices.

6. A method according to claim 1, wherein the signal includes a data stream associated with broadband access, the method further comprising:
   forwarding the signal to a computing system in support of the broadband access via a satellite broadcast system.

7. A method according to claim 1, further comprising:
   determining whether the received signal is authorized for access.

8. A computer-readable storage medium bearing instructions for distributing multi-media information to a plurality of access point devices, said instruction, being arranged, upon execution, to cause one or more processors to perform the method of claim 1.

9. A hub for providing home distribution of multi-media information from a satellite broadcast system, the hub comprising:
   a satellite tuner configured to receive a signal from the satellite broadcast system, wherein the signal represents video information and audio information associated with a plurality of broadcast channels;
   a demodulator configured to demodulate the received signal; and
   a decoder configured to decode the demodulated signal, wherein the decoded signal represents uncompressed video and audio information corresponding to one of the broadcast channels and is transmitted in uncompressed form to a plurality of access point devices.

10. A hub for providing home distribution of multi-media information from a satellite broadcast system, the hub comprising:
    means for receiving a signal from the satellite broadcast system, wherein the signal represents video information and audio information associated with a plurality of broadcast channels;
    means for demodulating the received signal; and
    means for decoding the demodulated signal, wherein the decoded signal represents uncompressed video and audio information corresponding to one of the broadcast channels and is transmitted in uncompressed form to a plurality of access point devices.

* * * * *